US006371228B1

(12) United States Patent
Husted et al.

(10) Patent No.: US 6,371,228 B1
(45) **Date of Patent: *Apr. 16, 2002**

(54) STABLE POWERED TRICYCLE WITH TRACTION STEERING

(75) Inventors: Royce H. Husted, R.R. 4, Box 550, Forest, VA (US) 24551; Joel P. Husted, Forest, VA (US)

(73) Assignee: Royce H. Husted, Forest, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/669,544

(22) Filed: Sep. 26, 2000

Related U.S. Application Data

(63) Continuation-in-part of application No. 09/503,068, filed on Feb. 12, 2000, now Pat. No. 6,273,212.

(51) Int. Cl.[7] ............................................ B62M 23/02

(52) U.S. Cl. ................................ 180/65.1; 280/250.1

(58) Field of Search ............................ 180/6.24, 65.1, 180/6.48, 907, 221; 280/250.1

(56) References Cited

U.S. PATENT DOCUMENTS

| | | | | | |
|---|---|---|---|---|---|
| 3,930,551 | A | * | 1/1976 | Cragg | 180/65 R |
| 4,037,676 | A | * | 7/1977 | Ruse | 180/6.5 |
| 4,422,515 | A | * | 12/1983 | Loveless | 180/6.5 |
| 4,759,418 | A | * | 7/1988 | Goldenfeld et al. | 180/65.1 |
| 4,805,712 | A | * | 2/1989 | Singleton | 180/65.1 |
| 4,840,076 | A | * | 6/1989 | Brubaker et al. | 74/143 |
| 5,078,227 | A | * | 1/1992 | Becker | 180/221 |
| 5,094,310 | A | * | 3/1992 | Richey et al. | 180/65.6 |
| 5,445,233 | A | * | 8/1995 | Fernie et al. | 180/6.5 |
| 5,477,935 | A | * | 12/1995 | Chen | 180/65.5 |
| 5,480,172 | A | * | 1/1996 | James | 280/250.1 |
| 5,562,174 | A | * | 10/1996 | Chen | 180/65.5 |
| 5,730,236 | A | * | 3/1998 | Miller et al. | 180/65.1 |
| 5,735,363 | A | * | 4/1998 | Horovitz et al. | 180/205 |
| 5,782,483 | A | * | 7/1998 | Rogers et al. | 280/642 |
| 6,050,356 | A | * | 4/2000 | Takeda et al. | 180/65.1 |
| 6,065,557 | A | * | 5/2000 | Von Keyserling | 180/221 |
| 6,273,212 | B1 | * | 8/2001 | Husted et al. | 180/907 |

* cited by examiner

*Primary Examiner*—J. J. Swann
*Assistant Examiner*—L. Lum
(74) *Attorney, Agent, or Firm*—Nicholas A Camasto

(57) ABSTRACT

A stable, low speed, powered tricycle with traction steering, includes a pair of freely rotatable traction wheels and corresponding pairs of friction rollers and braking surfaces that are selectively engageable therewith to effect propulsion and steering of the vehicle. A caster wheel supports the front of the vehicle frame. This forms a tricycle rolling system that maintains stability by automatically broadening a turn to obviate tipping.

8 Claims, 3 Drawing Sheets

STABLE POWERED TRICYCLE WITH TRACTION STEERING

CROSS REFERENCE TO RELATED APPLICATION

This application is a Continuation-in-Part of application Ser. No. 09/503,068, filed Feb. 12, 2000, entitled LIGHT-WEIGHT MANEUVERABLE POWER CHAIR now U.S. Pat. No. 6,273,212, issued Aug. 14, 2001.

BACKGROUND OF THE INVENTION

This invention relates generally to vehicles and specifically to a low speed traction steered powered tricycle that is very stable, lightweight and highly maneuverable.

The term powered as used herein is intended to apply to both battery powered and gasoline engine powered vehicles. Both indoor and outdoor operation of the powered vehicle of the invention is contemplated. It should be noted that the present invention is represented herein as a powered chair (FIG. 1), but it could benefit other low speed vehicles such as, without imitation, a riding lawn mower, (FIG. 2) or a golf cart (FIG. 3).

Contemporary powered chairs may be divided into two categories: those that steer by selectively operated traction wheels and those that steer by turning the front wheel or wheels.

The traction-steered vehicles are commonly referred to as powered wheelchairs. They are operated by a single joystick that interacts with a very complicated electronic control system for switching and modulating the requisite high current, low voltage, battery power. The electronic control systems are expensive, subject to radio wave interference and prone to service problems. Some electronic controls have been reported to spontaneously energize their vehicle motors when exposed to radio frequency interference, such as that from a cellular telephone. The potential danger is such that warning labels are now required in those vehicles and, in some instances, product recalls are under consideration.

Powered wheelchairs are generally not intended for use outdoors on unpaved surfaces, such as grass, dirt and bumpy trails. The chairs employ two gear motors to independently and directly drive the left and right wheels. Most powered wheelchairs have two rear-mounted drive wheels and two front caster wheels, all supported on a rigid frame structure. Over uneven or mildly bumpy terrain, the wheelchairs deliver a harsh ride as weight is shifted randomly between diagonal pairs of wheels. With this type of configuration steering is also uncontrollable since loss of traction of one drive wheel results in the opposite drive wheel thrusting the vehicle into a turn until traction is regained. This causes the vehicle to randomly dart to the left and to the right. The tendency could be overcome with a four-wheel suspension system but such a complicated solution is neither suitable nor practical for a powered wheelchair.

It should also be noted that, due to the requisite high ratio gearing of the vehicle, it is practically impossible to over drive the motors (to allow the vehicle to coast) when traveling downhill This inability to coast greatly reduces its range of travel, particularly in graded or hilly areas.

Powered chairs that directly steer a wheel (or a pair of wheels) are commonly referred to as scooters. Most scooters employ a tricycle configuration, with steering of the front wheel being accomplished by means of a handlebar. A three wheeled vehicle or tricycle has the advantage of maintaining a consistent load on each wheel and, in comparison with the powered wheelchair described above, provides a relatively smooth ride over bumpy surfaces. On the other hand, scooters have a relatively large turning radius and are not well suited for indoor use.

Scooters employ a single gear motor that drives the rear wheels through a differential While the tricycle configuration maintains substantially equal loading of the drive wheels under all normal surface conditions, the differential is subject to traction loss due to split coefficient. This may occur for example, when either drive wheel loses traction on a wet or slippery surface resulting in neither drive wheel being able to provide a driving force. The result is that the vehicle user, who is often incapable of walking or significant unassisted movement, is literally stranded. The costs and weight of a differential are about the same as an extra motor and gear reduction mechanism, but the controls on the scooter are less complicated and more reliable than the joystick systems used on the powered wheelchairs discussed above.

Because of their front wheel steering and tricycle configuration, scooters are highly unstable at practically all speeds. A sudden turn of the handlebar will invariably cause the tricycle to tip. The centrifugal force acting on such a high center of gravity vehicle tends to throw the vehicle (and occupant) up onto the front wheel and the outside drive wheel (the wheel at the outside of the turning radius). Simultaneously, the wheel at the inside of the turning radius is lifted off the ground. If the occupant does not immediately steer out of the turn (which is sometimes impossible) a roll over will occur. Often at the onset of tipping, the occupant reflexively applies the brakes in an attempt to regain control This exacerbates the predicament, since braking increases the centrifugal force, and usually results in an instant roll-over. Tipping is a classic problem with tricycle type vehicles and a unique means for overcoming the tipsy-tricycle syndrome is a primary feature of the present invention.

Powered wheelchairs and scooters are also bulky and heavy (generally weighing in the range of 150 to 250 pounds) and require special equipment to transport them. They are also very expensive items, and if the added cost of a specially equipped van with a power lift is considered, are prohibitive for most people. It is these major drawbacks that have prevented their widespread acceptance. The various shortcomings of the prior art powered wheelchairs and scooters, as well as hand-propelled wheelchairs are the subject of the copending parent application identified above.

The present invention provides a powered vehicle that is compact, inexpensive and maneuverable and will find ready application in its various forms as a safe and stable vehicle for all uses and by persons of all ages, provided that they have the use of both their arms. The present invention in its preferred embodiment as depicted in FIG. 1, offers numerous advantages over the prior art. It can be used on trails and various unpaved surfaces while maintaining control and traction and providing a smooth ride. The vehicle is highly maneuverable, which makes it ideal for negotiating tight spaces, such as those encountered indoors. Its freewheeling design permits coasting, which increases its range while mining battery weight. Its light weight and small size enables it to be transported by a conventional automobile (without special equipment) and its simplicity of design makes it inexpensive to own and operate, and reliable to use. A major advantage is that the powered vehicle of the invention remains safe and stable under all normally encountered road and operating conditions, and with all types of users.

Propulsion, steering, and braking of the inventive powered vehicle is provided by selectively engaging the periphery of the rear drive or traction wheels with corresponding motor-driven friction rollers or friction brake surfaces. The engagement between the friction rollers or brake surfaces and the traction wheels is controlled by a pair of manual control arms that the user simply moves down for propulsion and up for braking. Normal tuning is accomplished by engaging one friction roller with its corresponding traction wheel Very tight turns may be made by simultaneously engaging one friction roller with its associated traction wheel and engaging the opposite brake surface with its associated traction wheel. This configuration allows for the tight maneuvering necessary for indoor operation.

The inventive vehicle is also well suited for use on uneven or hilly surfaces. Its tricycle configuration keeps both driving wheels evenly loaded at all times, resulting in a smooth ride and predictable control. When both control arms are held down, both friction rollers are engaged with their corresponding traction wheels. This acts like a solid axle delivering torque to each traction wheel directly regardless of the coefficient of friction, unlike the operation that occurs with a differential.

The control arms are sprung-to-center so that the traction wheels are normally in a free wheeling state. The ability to coast greatly enhances the vehicle's speed and range, particularly in hilly areas. The caster wheel is located in front rather than the rear to provide a self-steering effect when coasting. This allows the vehicle to coast straight with little or no steering input from the occupant.

The vehicle of the present invention is highly stable due to its tricycle configuration and traction steering. During a hard turn, with one traction wheel being driven and the other traction wheel being braked, any tendency to go into an unstable (tipping) condition is obviated due to the effects of centrifugal force, which automatically lifts the braking traction wheel on the inside of the turning circle.

The preferred embodiment incorporates a simple, inexpensive and highly reliable control system that uses electrical switches to energize the motor when either control arm is actuated. Two 12-volt batteries may be operated in series or in parallel to provide two basic travel speeds. The user may, however, operate the vehicle at desired lower speeds by "jogging" the control arms to intersperse bursts of driving force with periods of coasting. Unlike the electronic control system described above, the simple electrical controls of the preferred embodiment are not affected by radio frequency signals or other airborne electrical interference.

While the preferred embodiment incorporates a DC permanent magnet motor, it should be understood that the invention is not to be so limited. A lightweight gasoline engine may offer advantages for outdoor use. A lightweight frame and transmission system minimizes weight, which permits a single motor to provide sufficient power for the vehicle. Whereas most battery powered vehicles weigh from 150 to 250 pounds, the powered vehicle of the invention weighs about 50 pounds. To further ease the effort of lifting the vehicle, the battery may be easily removed from the frame to reduce the vehicle weight by half As will be seen, the inventive powered chair also includes a comfortable, padded rigid seat, which is also easily removed to enable the powered vehicle to be transported in the trunk of a compact automobile.

OBJECTS OF THE INVENTION

A principal object of the invention is to provide a novel powered tricycle, with steady control and smooth ride characteristics on uneven surfaces, without a suspension.

Another object of the invention is to provide a powered tricycle that is stable and safe under all normally encountered operating conditions and terrain.

A further object of the invention is to provide a novel powered tricycle with improved traction on surfaces having a split coefficient of friction.

Still another object of the invention is to provide a novel powered tricycle with tight turning capability.

Yet another object of the invention is to provide a novel powered tricycle that can coast.

A still further object of the invention is to provide a novel powered tricycle that is small and lightweight enough for easy transportability.

Another object of the invention is to provide a novel powered tricycle that is highly reliable and inexpensive.

BRIEF DESCRIPTION OF THE DRAWINGS

These and other objects and advantages of the invention will be apparent upon reading the following description in conjunction with the drawings in which.

DETAILED DESCRIPTION OF THE INVENTION

Figure 1:
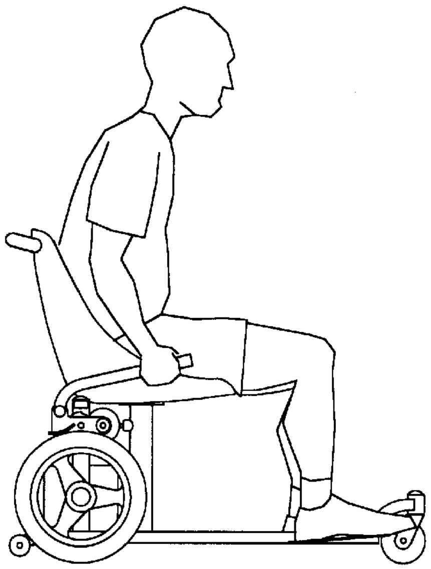
FIG. 1 is a side elevation of the powered chair version of the invention.
Figure 2:
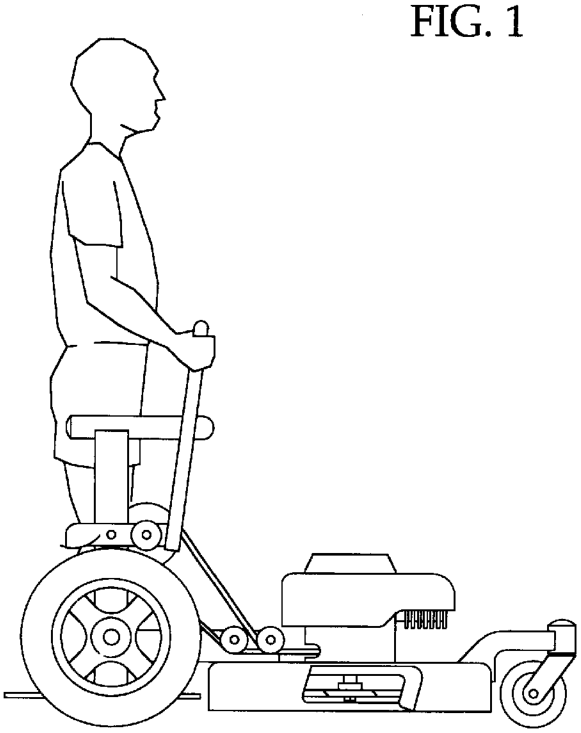
FIG. 2 is a side elevation of a riding lawnmower version of the invention.
Figure 3:
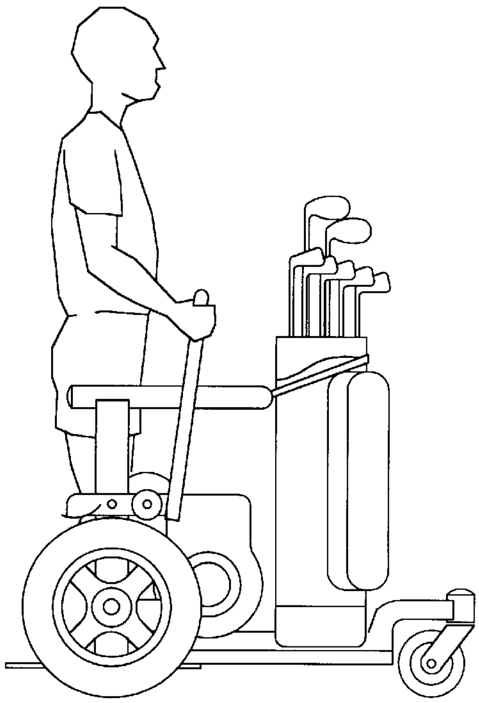
FIG. 3 is a side elevation of golf cart version of the invention.
Figure 4:
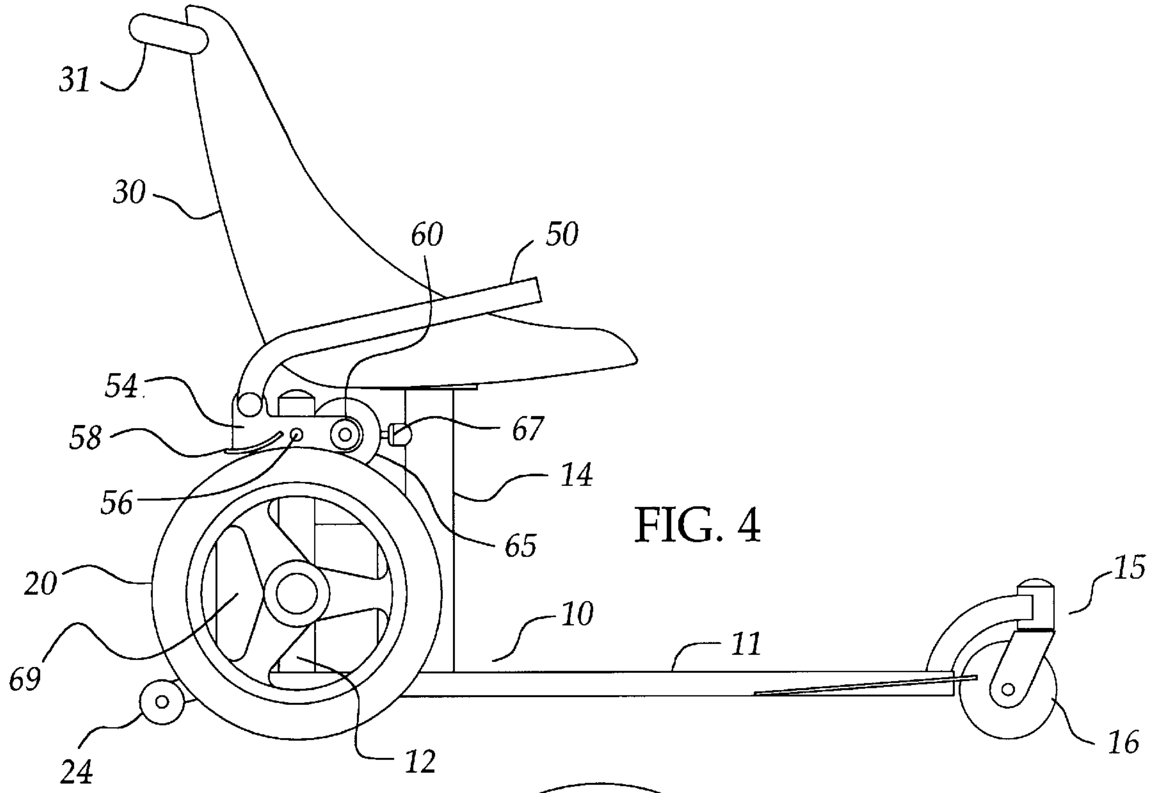
FIG. 4 is a detailed side elevation of powered vehicle of FIG. 1.
Figure 5:
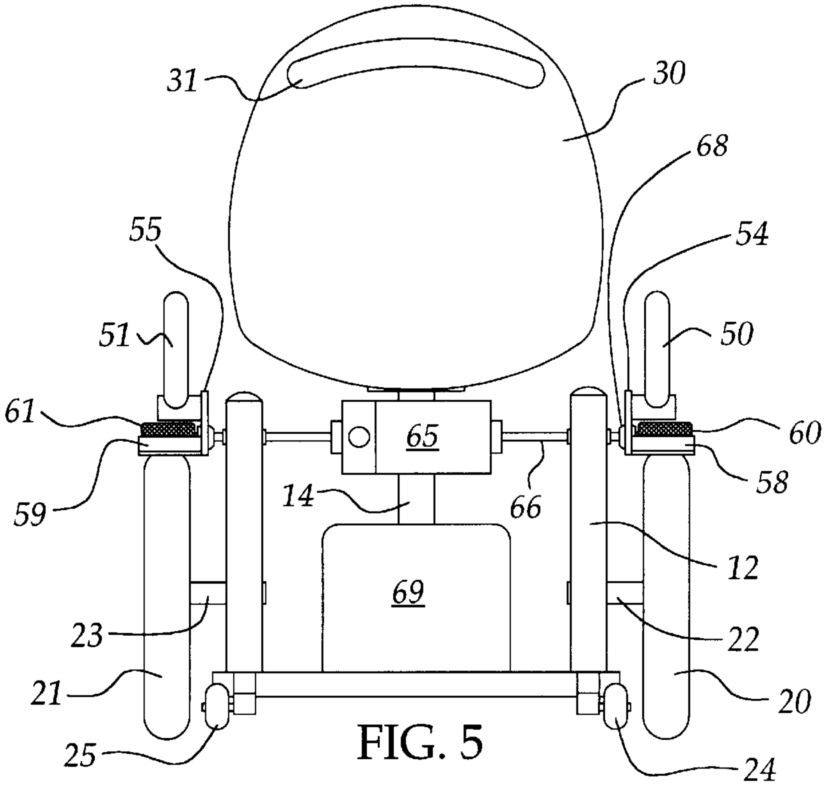
FIG. 5 is a detailed rear elevation of the powered vehicle of FIG. 1.

Referring to the drawings generally and to FIGS. 4 and 5 in particular, a powered chair includes a lightweight tubular frame 10, to opposite sides of which a pair of traction wheels 20 and 21 are mounted for freewheeling rotation by a pair of stub axles 22 and 23, respectively. A front frame tube 11 extends forward of the traction wheels to support a caster wheel assembly 15. The tricycle arrangement is especially beneficial when the powered vehicle is operated on non-uniform surfaces, because each of the three wheels is always in contact with the ground. This eliminates the violent ride characteristics of four wheeled, non-suspension, vehicles that result from the transfer of weight to opposite comer pairs of wheels.

A contoured, relatively rigid seat 30 is secured to an upright tubular frame member 14 of frame 10. A battery 69 is supported on the rear of frame 10. Seat 30 and battery 69 are preferably readily removable to enable the powered vehicle to be conveniently stowed in the trunk of a compact size automobile. Two small wheels 24 and 25 extend from the rear of frame 10 to prevent the vehicle from rotating about the axis of the traction wheels 20 and 21 when climbing steep hills. Under normal operating conditions, wheels 24 and 25 are not in contact with the ground.

The caster wheel 16 is the third wheel of the tricycle wheelbase. It should be noted that an alternative to the single caster could be a pair of casters spaced apart on a beam, which is pivotally supported at its center as shown in FIG.

7. While this arrangement is more complicated than a single caster, it is the functional equivalent of a single caster because it supports the frame at a single pivot point in front of and on center with the traction wheels.

The steering and propulsion control systems for the left and right traction wheels are identical and for this reason only the control system for the right traction wheel 20 will be described in detail. As best seen in FIGS. 4 and 5, the control system includes a control arm 50 and a rocker lever 54, which is secured to a right side upright leg 12 of frame 10 by a pivot 56. Rocker lever 54 carries a brake surface 58 that is located to the rear of pivot 56 and which overlies the periphery of traction wheel 20. Brake surface 58 may comprise any suitable material or surface texture for frictionally engaging traction wheel 20. A friction roller 60 is secured to a shaft 66 of a centrally disposed motor 65. Friction roller 60 is engageable with the radial periphery of traction wheel 20 for imparting a rotational force thereto, whereas brake surface 58 is engageable with the radial periphery 15 of traction wheel 20 for applying a braking force thereto. The friction roller and brake surface may readily be arranged to engage other portions of traction wheel 20 and the invention should not be limited to engagement with the radial periphery of the traction wheel. It will be appreciated by those skilled in the art that the friction rollers may comprise any well-known form of driver elements, such as gear wheels and the like, all within the spirit and scope of the present invention.

The motor 65 is supported by its own shaft 66. Torque from motor 65 is countered by frame member 14 through a flexible member 67, as best shown in FIG. 4. Flexible member 67 may comprise a piece of rubber or the like. The angular displacement between shaft 66 and rocker lever 54 is accommodated by a self-aligning bearing 68. Pulling up on control arm 50 results in brake surface 58 being forced into engagement with traction wheel 20. Thus operation of control arm 50 controls the propulsion and braking of traction wheel 20. Similarly, down and up movements of the opposite control arm 51 result in propulsion and braking of traction wheel 21. For straight-ahead movement of the powered vehicle, both control arms 50 and 51 are pushed down. For turns, only one of the control arms is pushed down. For very sharp turns, the control arms are operated in opposite directions to propel one traction wheel and simultaneously brake the other traction wheel. The powered vehicle is stopped by pulling up on both control arms.

When motor 65 is operating, it transmits rotary motion to the friction rollers 60 and 61. The rocker levers 54 and 55 are sprung to center and with no force applied to the control arms 50 and 51, there is no engagement between the radial peripheries of traction wheels 20 and 21 and either of the friction rollers 60 and 61, or either of the brake surfaces 58 and 59, respectively. In this condition the vehicle is free to coast down hills or to be manually pushed about by an assistant using a push handle 31 that is attached to the upper rear of seat 30. Pushing down on control arm 50 causes rocker lever 54 to rotate slightly about pivot 56 and force friction roller 60 into engagement with traction wheel 20. As control arm 50 is moved, a limit switch is activated by a cam (neither of which is shown) which switches power from the battery 69 to the motor 65.

Caster wheel 16 is freely rotatable and orients itself the directional movements generated by the traction wheels 20 and 21. The control arms 50 and 51 may be arranged to fold down for stowage. A simile spring-loaded pin and hole locking arrangement would be suitable for this purpose.

Figure 6:
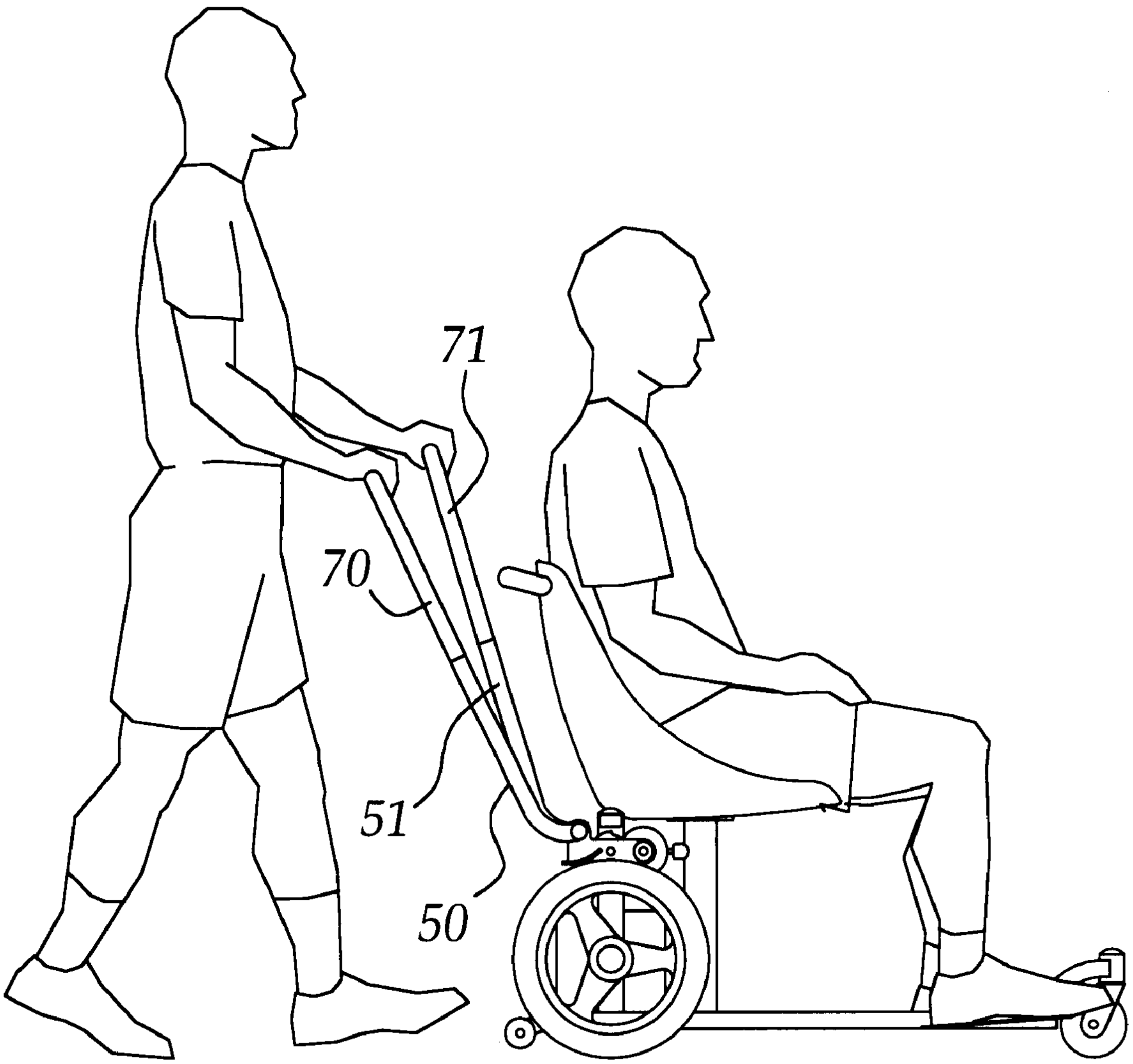
FIG. 6 is a side elevation of powered wheelchair of FIG. 1, with control handles for operation by a walking attendant.
Figure 7:
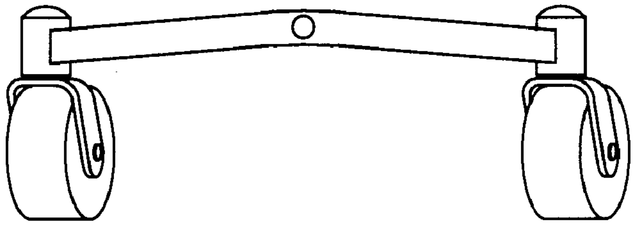
FIG. 7 is a front elevation of a pivoted dual caster assembly.

As illustrated in FIG. 6, the present invention may be adapted to provide power assistance when used as a walk-behind vehicle. This use is implemented by locking the control arms 50 and 51 in a generally upright position and inserting a set of control arm extensions 70 and 71 into the ends of control arms 50 and 51. This arrangement applies to users incapable of controlling the inventive powered vehicle themselves. This makes it possible for an assistant to effortlessly walk behind as they steer, brake and propel the powered vehicle.

The inventive powered vehicle is highly stable due to its tricycle configuration and traction steering. During a hard turn, with one traction wheel being driven and the other traction wheel being braked, any tendency to go into an unstable (tipping) condition is obviated due to the action of centrifugal force in automatically liking the braking traction wheel on the inside of the turning circle. This action relieves the braking traction of the inner traction wheel, thereby automatically broadening the turning radius and counteracting any instability. While broadening of the turning radius could be a detriment (for example, in an avoidance maneuver) the restriction of the invention to use on low speed vehicles insures that a full stop can be accomplished in a very short distance. For example if a user tries to turn quickly and the turning radius automatically broadens, the user can readily bring the vehicle to a full stop in a very short distance.

What has been described is a novel low speed powered vehicle that is maneuverable and highly stable. It is recognized that numerous changes to the described embodiment of the invention will be apparent to those skilled in the art without departing from its true spirit and scope. The invention is to be limited only as defined in the claims.

What is claimed is:

1. A low speed, stable, powered vehicle with traction steering comprising:

a frame;

a pair of traction wheels mounted for free rotation near the rear of aid frame;

a caster wheel system supporting said frame near the front center of said frame;

driving system selectively engageable with one or both of said traction wheels;

a braking system selectively engageable with one or both of said traction wheels; and a left and a right control arm for selectively moving said driving system and said braking system into engagement with one or both of said traction wheels for tractionally propelling, braking and steering said powered vehicle.

2. The powered vehicle of claim 1, wherein said driving system includes:

a motor, situated between and rotatably coupled to, a left friction roller and a right friction roller;

said driving system moving said friction rollers into engagement with said traction wheels responsive to appropriate movements of said control arms; and said braking system including brake surfaces that are moved into engagement with said traction wheels responsive to appropriate movements of said control arms.

3. The powered vehicle of claim 2, wherein said traction wheels include resilient tires and wherein said friction rollers are forcibly moved by said control arms into engagement with one or both of said resilient tires for propelling and steering said powered vehicle.

4. The powered vehicle of claim 3, wherein said during system further comprises:

a rocker lever pivotally mounted to each side of said frame adjacent a corresponding one of said traction wheels;

said control arms being mechanically linked to said rocker levers for pivoting said rocker levers to force said engagement between said friction rollers and said resilient tires; and said brake surfaces being situated on said rocker levers and being moved into engagement with said traction wheels responsive to appropriate movements of said control arms.

5. The powered vehicle of claim 4, further including a seat or platform, for supporting a person, mounted on said frame between said traction wheels.

6. The powered vehicle of claim 1, wherein said caster wheel system supports said powered vehicle at a point at the front of said frame for assuring normal continuous loading of each of said traction wheels.

7. A low speed, stable, powered vehicle with traction steering comprising:

a frame;

a pair of traction wheels mounted for free rotation near the rear of said frame;

a caster wheel system supporting said frame near the front center of said frame;

a driving system selectively engageable with one or both of said traction wheels;

a braking system selectively engageable with one or both of said traction wheels;

a left and a right control arm for selectively moving said driving system and said braking system into engagement with one or both of said traction wheels for tractionally propelling, braking and steering said powered vehicle;

said driving system and said braking system including:

a left friction roller and a right friction roller;

a motor situated between and rotatably coupled to said left and said right friction rollers;

said driving system moving said friction rollers into engagement with said traction wheels responsive to appropriate movements of said control arms; and said braking system including brake surfaces that are moved into engagement with said traction wheels responsive to appropriate movements of said control arms.

8. The powered vehicle of claim 7, further including a seat or platform, for supporting a person, mounted on said frame between said traction wheels.

* * * * *